July 1, 1924.
L. JUBÉ
1,499,662
VALVELESS SUCTION AND FORCE SYRINGE
Filed May 21, 1923
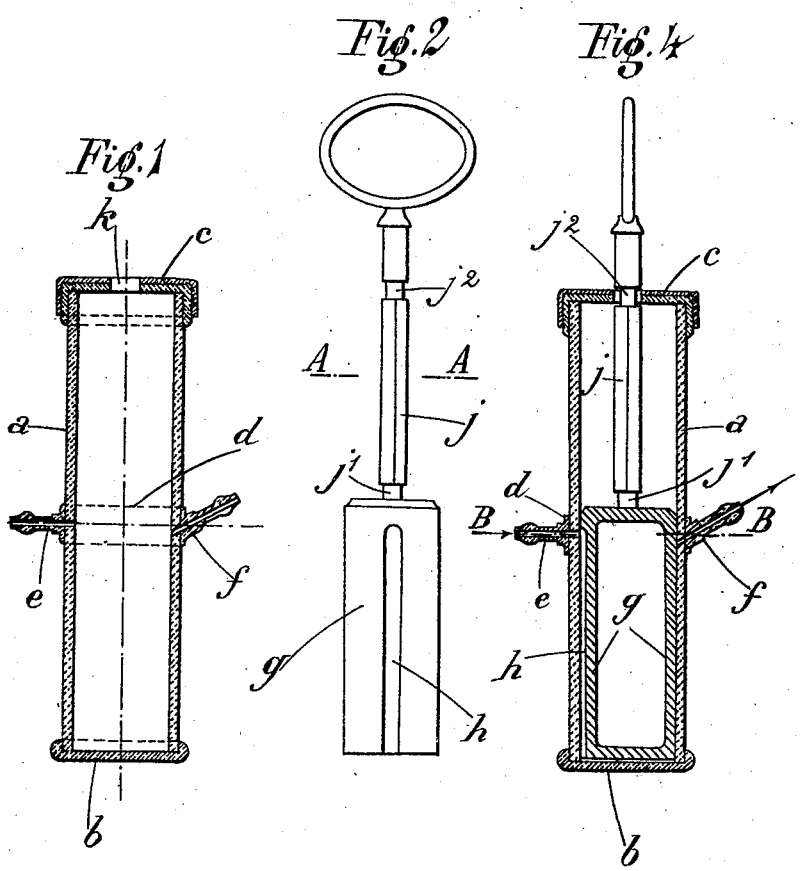

Patented July 1, 1924.

1,499,662

UNITED STATES PATENT OFFICE.

LOUIS JUBÉ, OF PARIS, FRANCE.

VALVELESS SUCTION AND FORCE SYRINGE.

Application filed May 21, 1923. Serial No. 640,473.

*To all whom it may concern:*

Be it known that I, LOUIS JUBÉ, a citizen of the French Republic, residing at Paris, France, have invented certain new and useful Improvements in Valveless Suction and Force Syringes (for which I have filed a patent application in France on the 3rd of June, 1922, No. 552,546), of which the following is a specification.

This invention relates to a suction- and force- syringe with lateral tubular arms for any kind of liquids and gases and specially adapted to serve for the direct transfusion of blood.

On the accompanying drawing the improved syringe is shown by way of example.

Fig. 1 is a section along the axis of the body or cylinder of the syringe.

Fig. 2 shows the piston in elevation.

Fig. 3 is a cross section on line A—A of Fig. 2.

Fig. 4 is a section along the axis of the whole syringe.

Fig. 5 is a cross section on line B—B of Fig. 4.

The syringe according to this invention comprises essentially a cylindrical pump body $a$ of glass pierced by two lateral holes diametrically opposite one another and midway between the two ends of the cylindrical body. This cylindrical body $a$ is closed at one end by a metal cap $b$ fixed by soldering and at the other end by a removable metal screw cap $c$ which has a square central hole $k$.

On the cylinder $a$ a ring $d$ is soldered which comprises two tubular arms $e$, $f$ each registering with one of the lateral holes of the cylinder. The tubular socket $e$ stands perpendicular to the axis of the cylinder and serves as suction tube. The forcing tube $f$ is upwardly inclined at an angle of approximately 45° to the axis of the cylinder.

A metal piston $g$ in the cylindrical body $a$ has in its outer surface a groove $h$ which extends along one of the generating lines and terminates at one end of the piston but does not extend to the other end of the piston. The piston $g$ has a rod $j$ of square cross section which fits into the square hole $k$ of the metal cap $c$ so that the angular position of the piston in the cylinder is determined by said rod and remains constant during the displacement of this piston. The parts $j'$ and $j^2$ of the rod $j$ are, however, of a smaller cross section than the other parts of the rod, these parts being arranged at such heights that in the extreme positions of the piston these parts $j'$, $j^2$ stand in the same plane as the metal cap $c$, so that at each end of its stroke the piston may be turned in the cylindrical body. The square hole $k$ of the metal cap $c$ is arranged in such a manner that in one position of the piston the groove $h$ stands opposite the hole which corresponds with the suction tube $e$. If, therefore, the piston is rotated through an angle of 180° the groove $h$ will face the hole corresponding with the force tube $f$, said groove extending on the surface of the piston to below said holes when the piston is pushed in to the end. The upper full part of the piston prevents the liquid from spreading out in an upward direction. The height and the stroke of the piston are, on the other hand, such that if the piston is pulled up entirely its lower surface stands below the holes.

The operation of the syringe of this construction is as follows:—The piston being at the end of its stroke, the groove $h$ facing the hole which corresponds with the tubular arm $e$, the other hole will be covered by the piston. The piston is pulled up, its angular position being maintained by the square rod $j$ engaging with the square hole $k$ of the metal cap $c$, and the liquid will be sucked in through the tubular arm $e$. When the piston has arrived at the end of its stroke the part $j'$ of smaller cross section than the rod $j$ is situated in the plane of the cap $c$ and the piston is now rotated through an angle of 180° so that the hole which corresponds with tubular arm $e$ is closed by the piston, the groove $h$ being brought opposite the hole which corresponds with the tubular arm $f$. If the piston is now pushed in, the liquid which has been sucked in is forced out through the inclined tubular arm $f$, this forcing out being facilitated by the inclination of the tube. When the piston has been pushed to the end of its stroke the narrow part $j^2$ of the piston rod $j$ is situated in the plane of the metal cap $c$ and this piston can be again rotated through an angle of 180°, so that the conditions are re-established which existed at the beginning of the operation. Rubber tubes being placed on each tubular arm $e$ and $f$, any liquids or gases may be sucked in and forced out; and, especially, blood may be transfused directly from artery to artery without having been modified by addition of a chemical substance designed to prevent the rapid coagulation.

I claim:—

A valveless suction- and force- syringe for any liquids and gases and especially for the transfusion of blood, comprising in combination a cylindrical pump having at opposite points midway of its height two holes, a straight tubular arm for the suction extending from one of said holes, an inclined tubular arm for the forcing extending from the other hole, a piston in said cylindrical body having a groove extending along one of the generating lines to the bottom surface of the piston but not to the upper end of the same, a metal screw cap on the upper end of the cylindrical body having a central square hole, a piston rod of square cross section guided in said square hole of the metal cap, a part of smaller cross section at the point of said piston rod which corresponds with the one end of the stroke of the piston and a part of smaller cross section at the point of said piston rod which corresponds with the other end of the stroke of the piston, arranged so that said parts of the piston rod are situated in the plane of said metal cap at each of the piston strokes and so that the piston may be rotated to bring said groove from one to the other hole to communicate alternately with the suction tube and with the force tube, and a metal cap closing the other end of said cylindrical body.

In testimony whereof I affix my signature in presence of two witnesses.

LOUIS JUBÉ.

Witnesses:
 HENRI BLOUIN,
 ANDRÉ BLOUIN.